(12) United States Patent
Zseng

(10) Patent No.: US 10,007,069 B2
(45) Date of Patent: Jun. 26, 2018

(54) FIBER OPTICAL CONNECTOR

(71) Applicant: Molex, LLC, Lisle, IL (US)

(72) Inventor: Fan-Chen Zseng, Taipei (TW)

(73) Assignee: Molex, LLC, Lisle, IL (US)

( * ) Notice: Subject to any disclaimer, the term of this patent is extended or adjusted under 35 U.S.C. 154(b) by 0 days. days.

(21) Appl. No.: 15/661,097

(22) Filed: Jul. 27, 2017

(65) Prior Publication Data
US 2018/0031782 A1 Feb. 1, 2018

(30) Foreign Application Priority Data

Jul. 29, 2016 (CN) .......................... 2016 1 0614815

(51) Int. Cl.
*G02B 6/36* (2006.01)
*G02B 6/38* (2006.01)

(52) U.S. Cl.
CPC ........... *G02B 6/3878* (2013.01); *G02B 6/387* (2013.01); *G02B 6/3821* (2013.01); *G02B 6/3823* (2013.01); *G02B 6/3825* (2013.01); *G02B 6/3887* (2013.01); *G02B 6/3847* (2013.01); *G02B 6/3874* (2013.01); *G02B 6/3897* (2013.01)

(58) Field of Classification Search
USPC ......................................................... 385/59
See application file for complete search history.

(56) References Cited

U.S. PATENT DOCUMENTS

| 6,146,023 | A  | * | 11/2000 | Weigel  | G02B 6/3879 385/139 |
| 9,022,667 | B2 | * | 5/2015  | Fabian  | G02B 6/3809 385/53  |
| 9,442,258 | B2 | * | 9/2016  | Mougin  | G02B 6/3825 |
| 2002/0150348 | A1 | * | 10/2002 | Nguyen | G02B 6/3821 385/59 |
| 2006/0056771 | A1 | * | 3/2006  | Dent    | G02B 6/3847 385/55 |

FOREIGN PATENT DOCUMENTS

| CN | 103901554 A | 7/2014 |
| TW | M494316 U | 1/2015 |

* cited by examiner

*Primary Examiner* — Eric Wong
(74) *Attorney, Agent, or Firm* — Bo Huang

(57) ABSTRACT

A fiber optical connector comprises at least one fiber optical connector and a receptacle. The least one fiber optical connector comprises an outer housing, an inner housing, a plurality of ferrules, a plurality of compressible springs, a plurality of optical fibers, a supporting seat and a rear supporting assembly. The rear supporting assembly comprises a rear supporting tube, a ring, a pipe and a sleeve. The plurality of ferrules are provided in the inner housing and the inner housing is provided with outer latching portions at two sides of the inner housing; the rear supporting assembly further comprises a clamping collar, the clamping collar is sheathed on an outer surface of a rear segment of the pipe. The receptacle is provided with mating tubes in which the ferrules of the at least one fiber optical connector are correspondingly inserted. With such a configuration, the number of ferrules provided inside a single SC connector of the optical fiber standard specification is increased.

14 Claims, 10 Drawing Sheets

FIBER OPTICAL CONNECTOR

RELATED APPLICATIONS

This application claims priority to Chinese Application No. 201610614815.8, filed Jul. 29, 2016, which is incorporated herein by reference in its entirety.

TECHNICAL FIELD

The present disclosure relates to a fiber optical connector, referring to a fiber optical connector and receptacle which can allow a SC connector of the optical fiber standard specification to be provided with a plurality of ferrules inside the SC connector and to be inserted in and latched with the receptacle and allow the plurality of ferrules to be respectively inserted in a plurality of mating tubes of the receptacle.

BACKGROUND ART

According to the general existing SC connector (Subscriber Connector/Standard Connector of Optical Fiber connectors), because of its considerable size, and a center of each SC connector is only provided with a single ferrule, so the SC connector considerably occupies the space of an optical fiber tower, when the user wants to expand the number of the SC connectors, because the space of the optical fiber tower which originally receives the SC connectors is constant, the user must additionally build a new optical fiber tower for such an expanding, and each optical fiber tower costs at least 100 million yuan, the cost is relatively very high, the existing SC connector only has a single ferrule, it is impossible for the user to attain increasing the number of ferrules without changing the inside of the optical fiber tower and without increasing the number of SC connectors, thereby resulting in the use of its practicability to be greatly discounted, this is strongly desired for the industry and consumers to break through.

SUMMARY

In order to resolve the deficiencies in the prior art, a first object of the present disclosure is to provide a fiber optical connector which can allow a SC connector of the optical fiber standard specification to be provided with a plurality of ferrules inside the SC connector a and to be inserted in and latched with the receptacle and allow the plurality of ferrules to be respectively inserted in a plurality of mating tubes of the receptacle, so as to overcome the deficiencies in the prior art.

A second object of the present disclosure is to provide a fiber optical connector which increases the number of ferrules provided inside a single SC connector of the optical fiber standard specification, increase capacity without increasing an additional optical fiber tower, saves space and lowers cost.

Another object of the present disclosure is to provide a fiber optical connector which effectively promotes ease of use.

In technical means to resolve the problems, in order to attain the above objects, the present disclosure provides a fiber optical connector, the fiber optical connector comprises an outer housing, an inner housing, a plurality of ferrules, a plurality of compressible springs, a plurality of optical fibers, a supporting seat and a rear supporting assembly; the outer housing is sheathed on the inner housing, the outer housing is provided with side holes at two sides of the outer housing, the inner housing is provided inside the outer housing and has a penetrating board at one end of the inner housing, the penetrating board is provided with a plurality of penetrating holes, the inner housing is provided with outer latching portions at two sides of the inner housing, the outer latching portions correspondingly expose to the side holes at the two sides of the outer housing, the plurality of ferrules are provided in the inner housing and front ends of the plurality of ferrules respectively extend out of the penetrating holes of the penetrating board, a rear segment of each of the plurality of ferrules is sheathed with a compressible spring, and the plurality of ferrules respectively connect the plurality of optical fibers, the supporting seat is sheathed on the rear segments of the plurality of ferrules and provides support for the plurality of compressible springs, the rear supporting assembly is assembled and fixed to the inner housing, the plurality of ferrules, the plurality of compressible springs and the supporting seat are assembled in the rear supporting assembly and the inner housing.

In an embodiment, the supporting seat is provided with a plurality of recessed grooves laterally opened and a plurality of through holes each positioned in one recessed groove, each ferrule, the compressible spring and the optical fiber are laterally placed in the recessed groove and the through hole of the supporting seat.

In an embodiment, the plurality of optical fibers are contained in a cable, the cable comprises an outer protective layer enclosing the plurality of optical fibers, the rear supporting assembly is sheathed on the cable and the plurality of optical fibers of the cable; the rear supporting assembly comprises a rear supporting tube, a ring, a pipe and a sleeve, the rear supporting assembly is assembled and fixed to the inner housing, wherein the rear supporting tube is inserted in the rear segment of the inner housing and is positioned at a rear end of the supporting seat, the ring is sheathed on the outer protective layer and the plurality of optical fibers of a front end of the cable, the pipe has a front section which is large and a rear section which is small, a taping portion is formed between the front section and the rear section, the front section of the pipe is sheathed on an outer surface of a rear end of the rear supporting tube, the ring is positioned inside the pipe at the taping portion, the sleeve is assembled to a rear segment of the rear supporting tube and encloses the pipe and the plurality of optical fibers.

In an embodiment, the rear supporting assembly further comprises a clamping collar, the clamping collar is sheathed on an outer surface of a rear segment of the pipe.

In an embodiment, an inner surface of a front end of the sleeve is provided with an inner flange, an outer wall surface of the rear supporting tube is provided with an annular groove for latching on the inner flange of the sleeve.

In an embodiment, an outer wall of the rear supporting tube is provided with a plurality of latching flanges for respectively latching on a plurality of openings which are provided in a wall surface of the rear segment of the inner housing.

In an embodiment, the fiber optical connector is provided with a dustproof cover, one end of the dustproof cover is provided with a handle, the other end of the dustproof cover is provided with a plurality of sheathing ducts in which the plurality of ferrules of the fiber optical connector are respectively inserted, and two sides of the dustproof cover each are provided with a side hook correspondingly latching on the outer latching portion of the fiber optical connector.

In technical means to resolve the problems, in order to attain the above objects, the present disclosure further provides a fiber optical connector, which comprises: at least one fiber optical connector which comprises an outer housing, an inner housing, a plurality of ferrules, a plurality of compressible springs, a plurality of optical fibers, a supporting seat and a rear supporting assembly, the outer housing is sheathed on the inner housing, the outer housing is provided with side holes at two sides of the outer housing, the inner housing is provided inside the outer housing and has a penetrating board at one end of the inner housing, the penetrating board is provided with a plurality of penetrating holes, the inner housing is provided with outer latching portions at two sides of the inner housing, the outer latching portions correspondingly expose to the side holes at the two sides of the outer housing, the plurality of ferrules are provided in the inner housing and front ends of the plurality of ferrules respectively extend out of the penetrating holes of the penetrating board, a rear segment of each of the plurality of ferrules is sheathed with a compressible spring, and the plurality of ferrules respectively connect the plurality of optical fibers, the supporting seat is sheathed on the rear segments of the plurality of ferrules and providing support for the plurality of compressible springs, the rear supporting assembly is assembled and fixed to the inner housing, the plurality of ferrules, the plurality of compressible springs and the supporting seat are assembled in the rear supporting assembly and the inner housing; and a receptacle provided with mating tubes in which the ferrules of the at least one fiber optical connector are correspondingly inserted.

In an embodiment, the supporting seat is provided with a plurality of recessed grooves laterally opened and a plurality of through holes each positioned in one recessed groove, each ferrule, the compressible spring and the optical fiber are laterally placed in the recessed groove and the through hole of the supporting seat.

In an embodiment, the plurality of optical fibers are contained in a cable, the cable comprises an outer protective layer enclosing the plurality of optical fibers, the rear supporting assembly is sheathed on the cable and the plurality of optical fibers of the cable; the rear supporting assembly comprises a rear supporting tube, a ring, a pipe and a sleeve, the rear supporting assembly is assembled and fixed to the inner housing, wherein the rear supporting tube is inserted in the rear segment of the inner housing and is positioned at a rear end of the supporting seat, the ring is sheathed on the outer protective layer and the plurality of optical fibers of a front end of the cable, the pipe has a front section which is large and a rear section which is small, a taping portion is formed between the front section and the rear section, the front section of the pipe is sheathed on an outer surface of a rear end of the rear supporting tube, the ring is positioned inside the pipe at the taping portion, the sleeve is assembled to a rear segment of the rear supporting tube and encloses the pipe and the plurality of optical fibers.

In an embodiment, the rear supporting assembly further comprises a clamping collar, the clamping collar is sheathed on an outer surface of a rear segment of the pipe.

In an embodiment, an inner surface of a front end of the sleeve is provided with an inner flange, an outer wall surface of the rear supporting tube is provided with an annular groove for latching on the inner flange of the sleeve.

In an embodiment, an outer wall of the rear supporting tube is provided with a plurality of latching flanges for respectively latching on a plurality of openings which are provided in a wall surface of the rear segment of the inner housing.

In an embodiment, a center of the receptacle is provided with a hollow portion for insertion of one end of the fiber optical connector, a center of the hollow portion is provided with a middle plate and two sides of the middle plate each have a plurality of mating tubes, the mating tubes of the two sides of the receptacle are communicated, two sides of the receptacle each are provided with an inner latching portion inside the receptacle for correspondingly latching on the outer latching portion of two fiber optical connectors.

Comparison with the prior art, with such a structure, the present disclosure can allow a SC connector of the optical fiber standard specification to be provided with a plurality of ferrules inside the SC connector and to be inserted in and latched with the receptacle and allow the plurality of ferrules to be respectively inserted in a plurality of mating tubes of the receptacle, and in turn the present disclosure attains to increase the number of ferrules provided inside a single SC connector of the optical fiber standard specification, increase capacity without increasing an additional optical fiber tower, save space and lower cost, effectively promote ease of use, can significantly expand the utilization of the industry and possesses novelty and inventive step.

DETAILED DESCRIPTION OF THE PREFERRED EMBODIMENTS

In order to facilitate the examiner to understand features, contents and advantages of the present disclosures and effects attained by the present disclosure, the present disclosure will be described in detail by means of embodiments in combination with the appended figures and, the figures used herein are only intended to be exemplary and assist the description and are not configured by the true proportion and precision after the present disclosure is implemented, therefore the patent scope of the present disclosure in actual implementation is not limited to the proportion and configuration relationship as shown in the appended figures.

Figure 1:
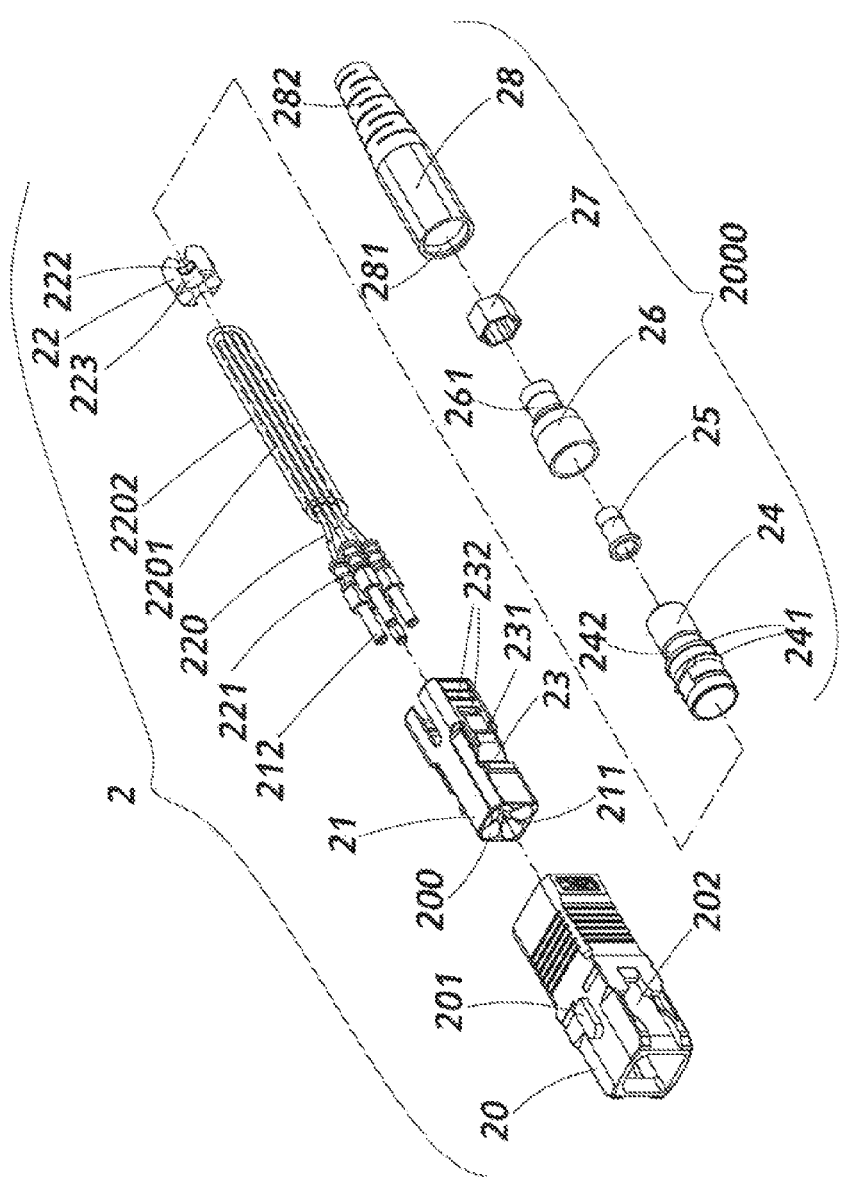
FIG. 1 is a perspective exploded view of one fiber optical connector of the present disclosure.
Figure 2:
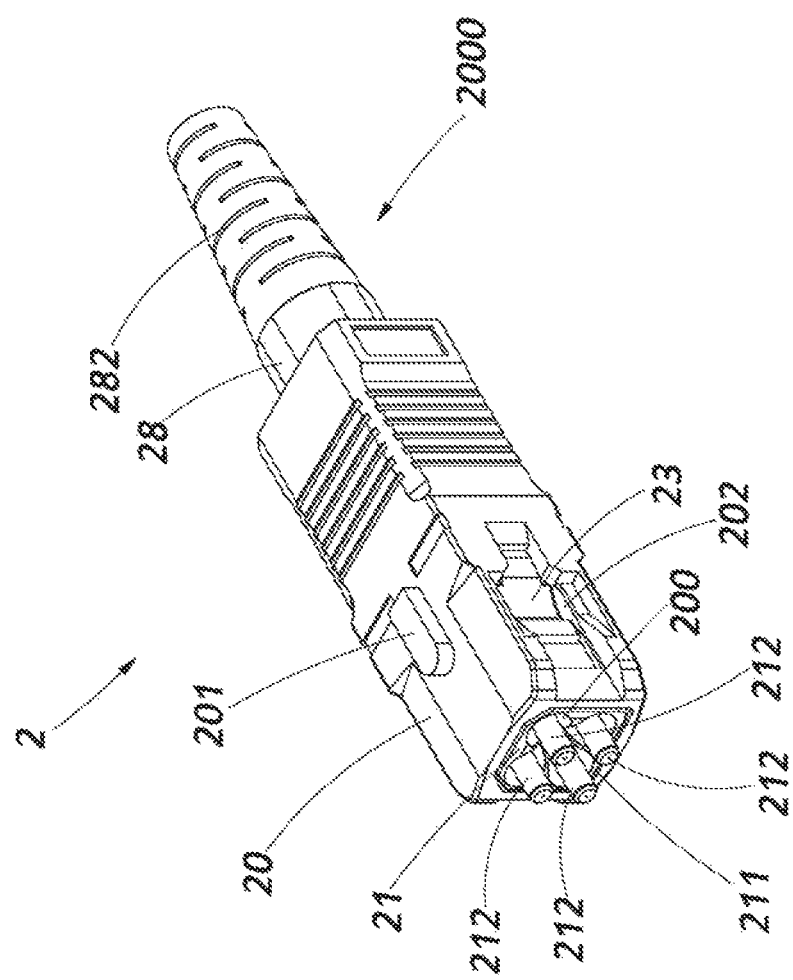
FIG. 2 is a perspective assembled view of the fiber optical connector of the present disclosure.
Figure 3:
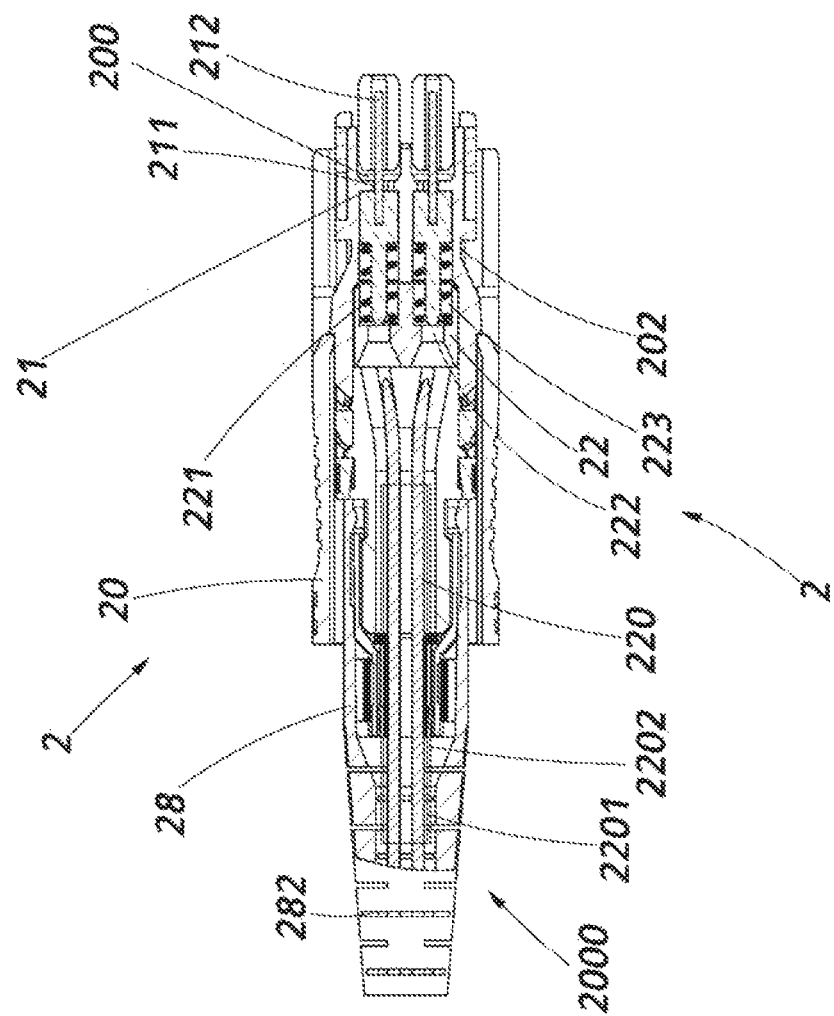
FIG. 3 is a sectional assembled view of the fiber optical connector of the present disclosure.

Referring to FIG. 1, FIG. 2, FIG. 3 and FIG. 9, these figures respectively are a perspective exploded view, a perspective assembled view and a sectional assembled view of one fiber optical connector of the present disclosure and a perspective sectional assembled view of FIG. 2 of the present disclosure. In an embodiment, a fiber optical connector of the present disclosure comprises at least one fiber optical connector 2, the fiber optical connector 2 comprises an outer housing 20, an inner housing 21, a plurality of ferrules 212, a plurality of compressible springs 221, a plurality of optical fibers 220, a supporting seat 22 and a rear supporting assembly 2000, the outer housing 20 are sheathed on the inner housing 21, the rear supporting assembly 2000 comprises a rear supporting tube 24, a ring 25, a pipe 26, a clamping collar 27 and a sleeve 28. The outer housing 20 is provided with side holes 202 at two sides of the outer housing 20, and is provided with a guiding block 201 at at least one end of the outer housing 20. The inner housing 21 is provided inside the outer housing 20 and has a penetrating board 200 at one end of the inner housing 21, the penetrating board 200 is provided with a plurality of penetrating holes 211, the inner housing 21 is provided with outer latching portions 23 at two sides of the inner housing 21, the outer latching portions correspondingly expose to the side holes 202 at the two sides of the outer housing 20, a rear end of each outer latching portion 23 is provided with a latching block 231 for latching on a rear end of one of the side holes 202 at the two sides of the outer housing 20, a wall surface of a rear segment of the inner housing 21 is provided with a plurality of openings 232. The plurality of ferrules 212 are provided in the inner housing 21 and front ends of the plurality of ferrules 212 respectively extend out of the plurality of penetrating holes 211 of the penetrating board 200, a rear segment of each of the plurality of ferrules 212 is sheathed with a compressible spring 221, and the plurality of ferrules 212 respectively connect the plurality of optical fibers 220. The supporting seat 22 is provided with a plurality of recessed grooves 223 laterally opened and a plurality of through holes 222 each positioned in one recessed groove 223, the supporting seat 22 is sheathed on the rear segments of the plurality of ferrules 212, each ferrule 212 together with one compressible spring 221 and one optical fiber 220 can be laterally placed in the recessed groove 223 and the through hole 222 of the supporting seat 22, the supporting seat 22 provides support for a rear end of each compressible spring 221 to allow that the compressible spring 221 positioned between the ferrule 212 and the supporting seat 22 can be compressed when the ferrule 212 moves backwardly under an external force, and the through hole 222 in the recessed groove 223 of the supporting seat 22 is used to allow the ferrule 212 to pass through when the ferrule 212 moves backwardly, so as not to obstruct the backward movement of the ferrule 212.

The plurality of optical fibers 220 are contained in a cable 2201, the cable 2201 comprises an outer protective layer 2202 enclosing the plurality of optical fibers 220, the rear supporting assembly 2000 is sheathed on the cable 2201 and the plurality of optical fibers 220 of the cable 2201, the rear supporting assembly 2000 is assembled and fixed to the inner housing 21, the plurality of ferrules 212, the plurality of compressible springs 221 and the supporting seat 22 are assembled in the rear supporting assembly 2000 and the inner housing 21. The rear supporting tube 24 is inserted in the rear segment of the inner housing 21 and positioned at a rear end of the supporting seat 22 to support the supporting seat 22; an outer wall of the rear supporting tube 24 is provided with a plurality of latching flanges 241 for respectively latching on the plurality of openings 232 in the wall surface of the rear segment of the inner housing 21; the ring 25 is sheathed on the outer protective layer 2202 and the plurality of optical fibers 220 at a front end of the cable 2201 for protecting the plurality of optical fibers 220 of the cable 2201 exposed at the front end of the cable 2201; the pipe 26 has a front section which is large and a rear section which is small, a taping portion 261 is formed between the front section and the rear section, the front section of the pipe 26 is sheathed on an outer surface of a rear end of the rear supporting tube 24, the ring 25 is positioned inside the pipe 26 at the taping portion 261; the clamping collar 27 can be clamped by a clamping tool and deformed to clamp and fix the pipe 26, the ring 25 and the plurality of optical fibers 220 positioned in the ring 25, the sleeve 28 is assembled to a rear segment of the rear supporting tube 24 and encloses and fixes the plurality of optical fibers 220, the clamping collar 27 and the pipe 26; an inner surface of a front end of the sleeve 28 has an inner flange 281, an outer wall surface of the rear supporting tube 24 has an annular groove 242 for latching on the inner flange 281 of the sleeve 28, a rear end of the sleeve 28 has a pressure relief portion 282 with a plurality of channels to provide protection and limit the maximum angle of bending of the cable 2201 when the cable 2201 containing the optical fibers 220 bends. In the embodiment, the fiber optical connector 2 is provided with four ferrules 212 and the relevant configuration mounting the four ferrules 212, the number of the ferrules 212 and the relevant configuration may be varied if desired.

Figure 4:
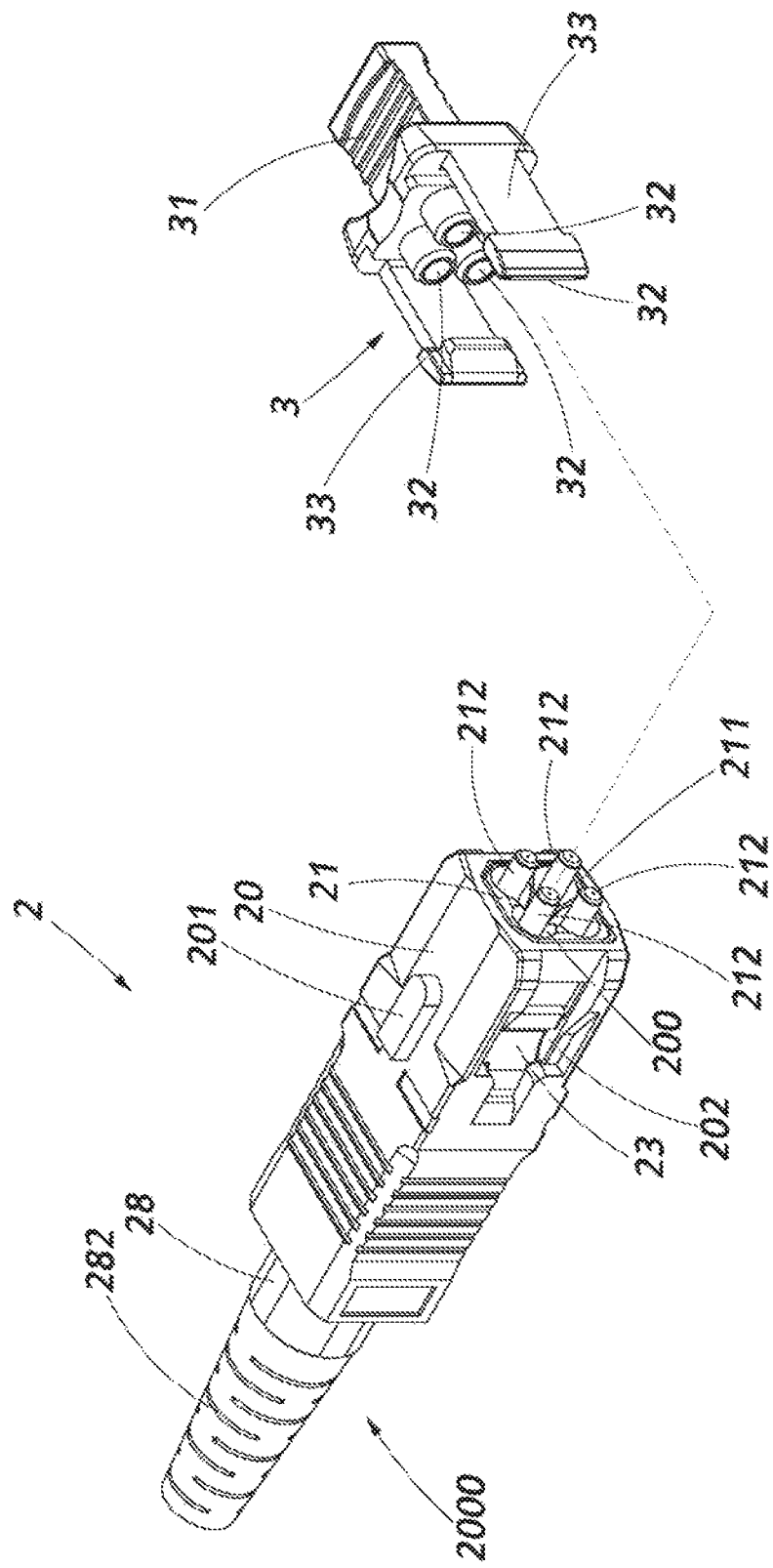
FIG. 4 is a perspective exploded view of the fiber optical connector provided with a dustproof cover according to the present disclosure.
Figure 5:
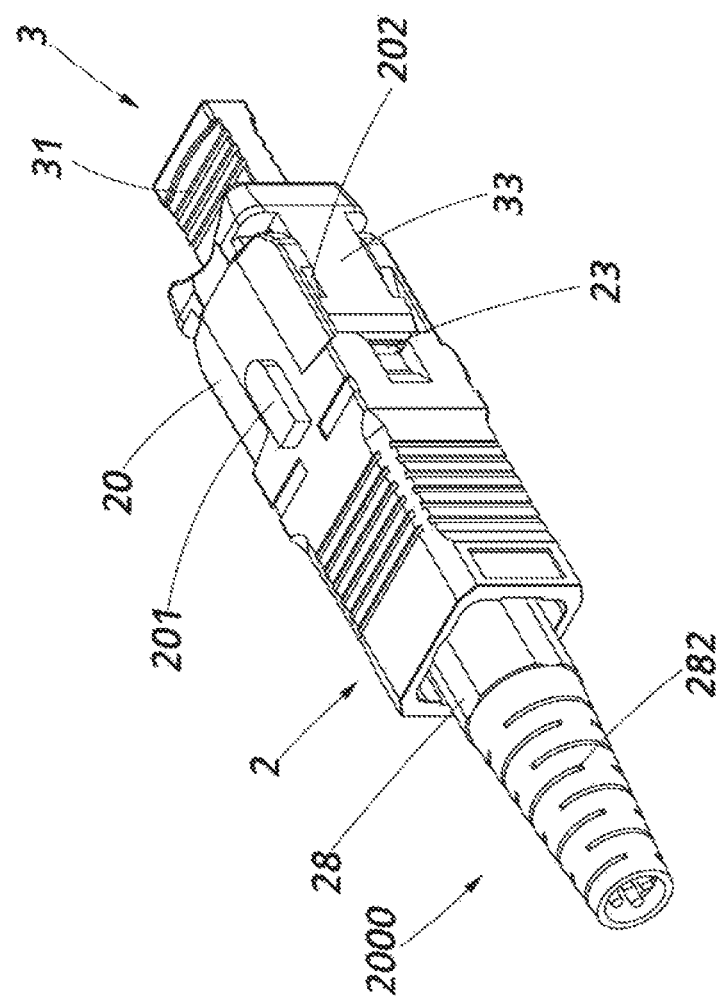
FIG. 5 is a perspective assembled view of the fiber optical connector provided with the dustproof cover according to the present disclosure.
Figure 6:
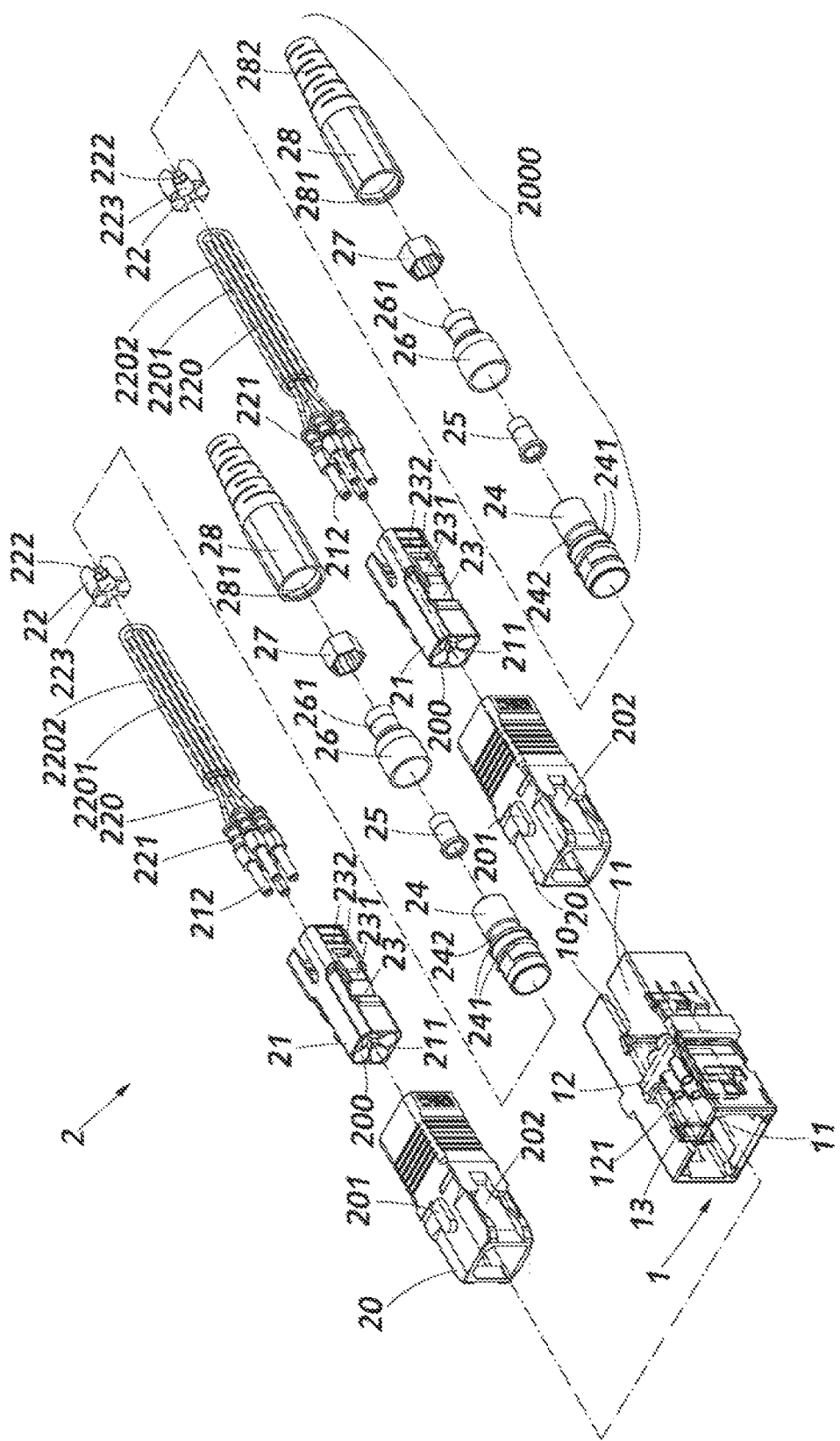
FIG. 6 is a perspective exploded view of one embodiment of the present disclosure, shows two fiber optical connectors and one receptacle.
Figure 7:
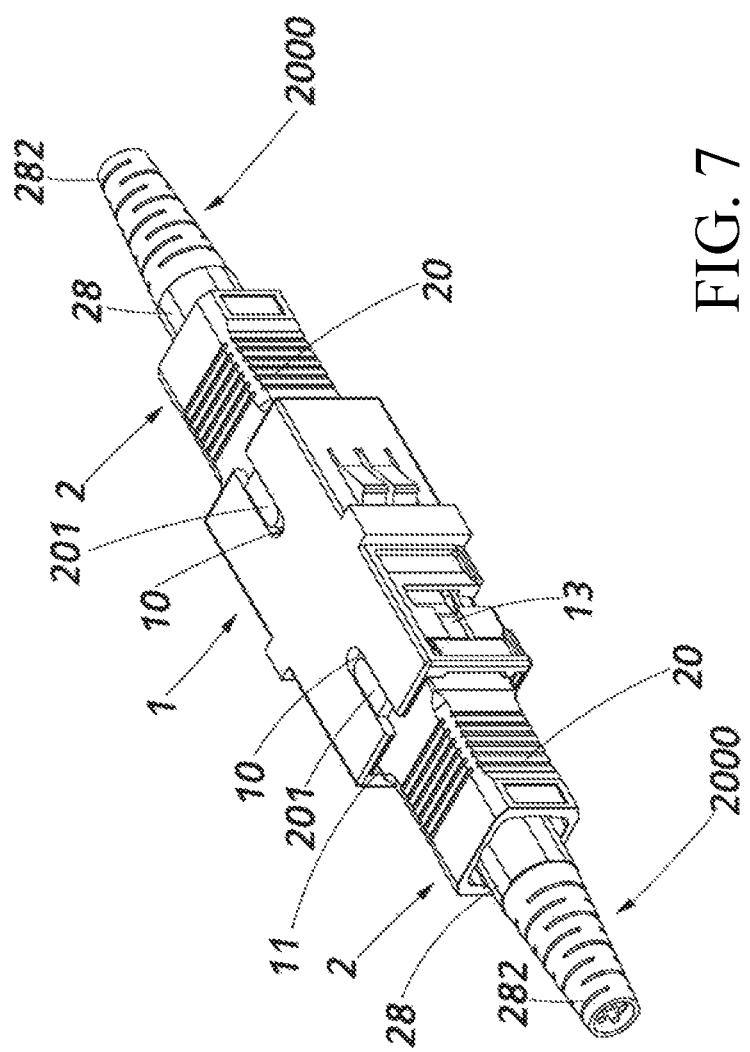
FIG. 7 is a perspective assembled view of the one embodiment of the present disclosure, shows two fiber optical connectors and one receptacle.

Referring to FIG. 4 and FIG. 5, these figures are a perspective exploded view and a perspective assembled view of the fiber optical connector provided with a dustproof cover according to the present disclosure. The fiber optical connector 2 of the present disclosure is provided with a dustproof cover 3, one end of the dustproof cover 3 is provided with a handle 31, the other end of the dustproof cover 3 is provided with a plurality of sheathing duct 32 in which the plurality of ferrules 212 of the fiber optical connector 2 are respectively inserted, and two sides of the dustproof cover 3 each are provided with a side hook 33 correspondingly latching on the outer latching portion 23 of the inner housing 21 of the fiber optical connector 2.

Figure 8:
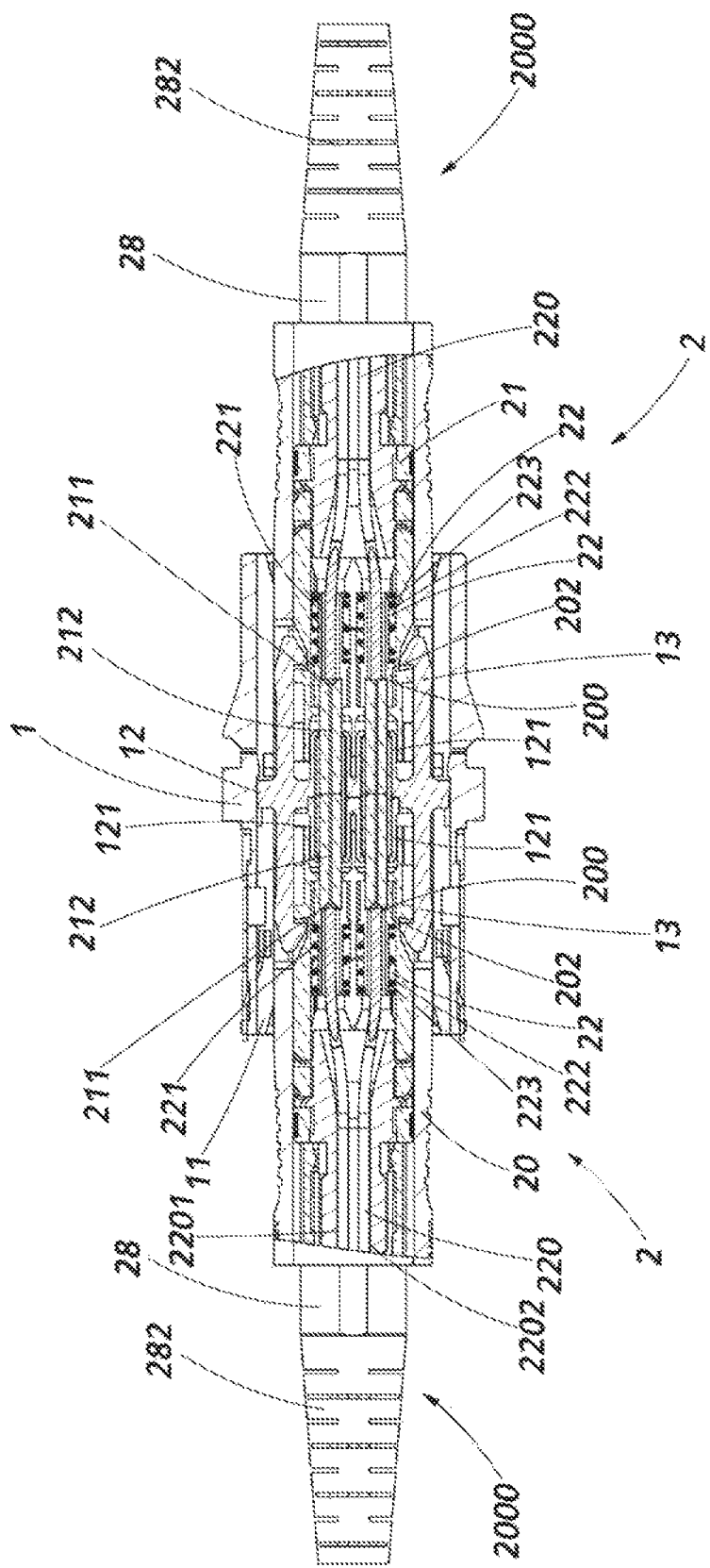
FIG. 8 is a sectional assembled view of the one embodiment of the present disclosure, shows two fiber optical connectors and one receptacle.
Figure 9:
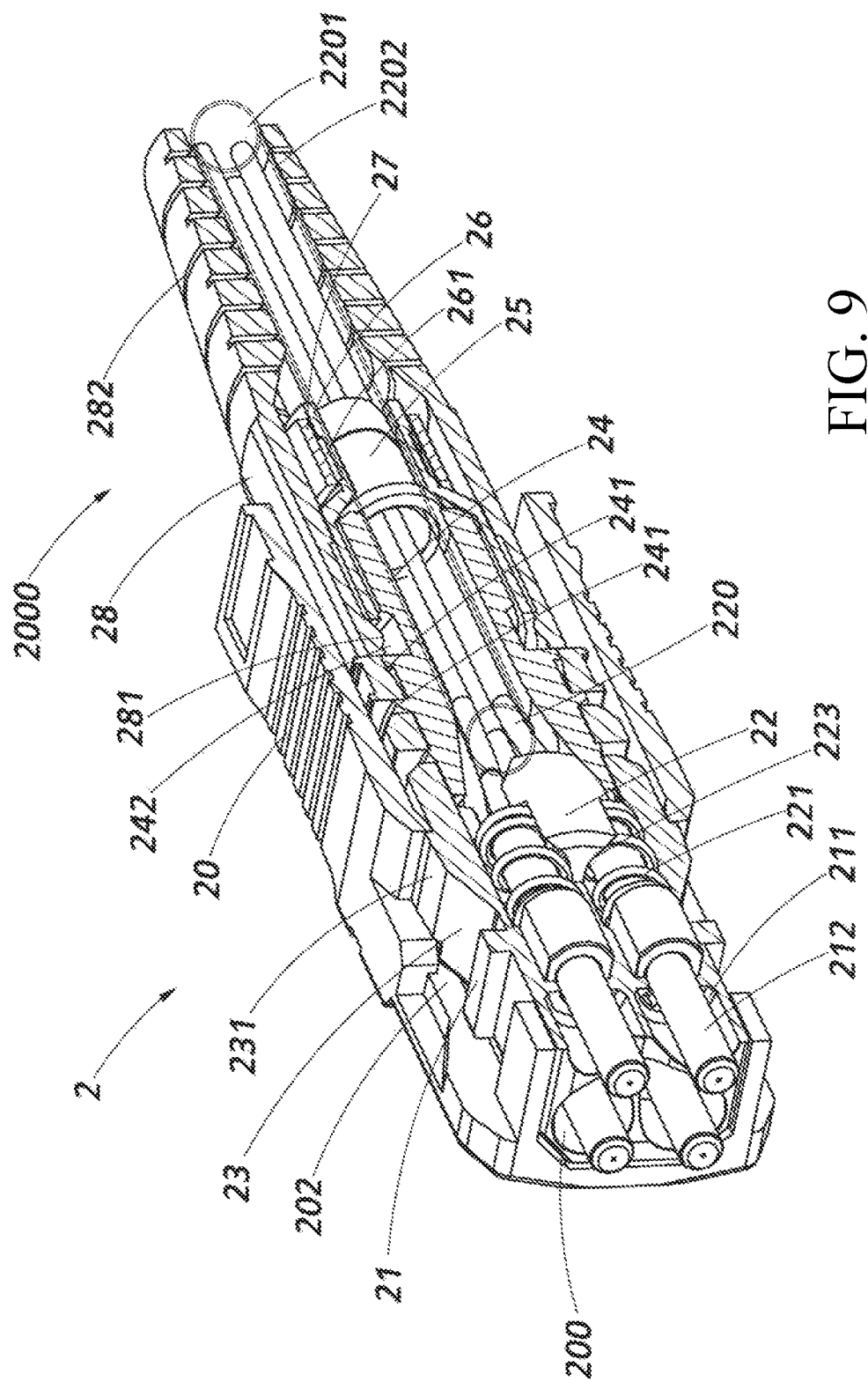
FIG. 9 is a perspective sectional assembled view of FIG. 2 of the present disclosure.
Figure 10:
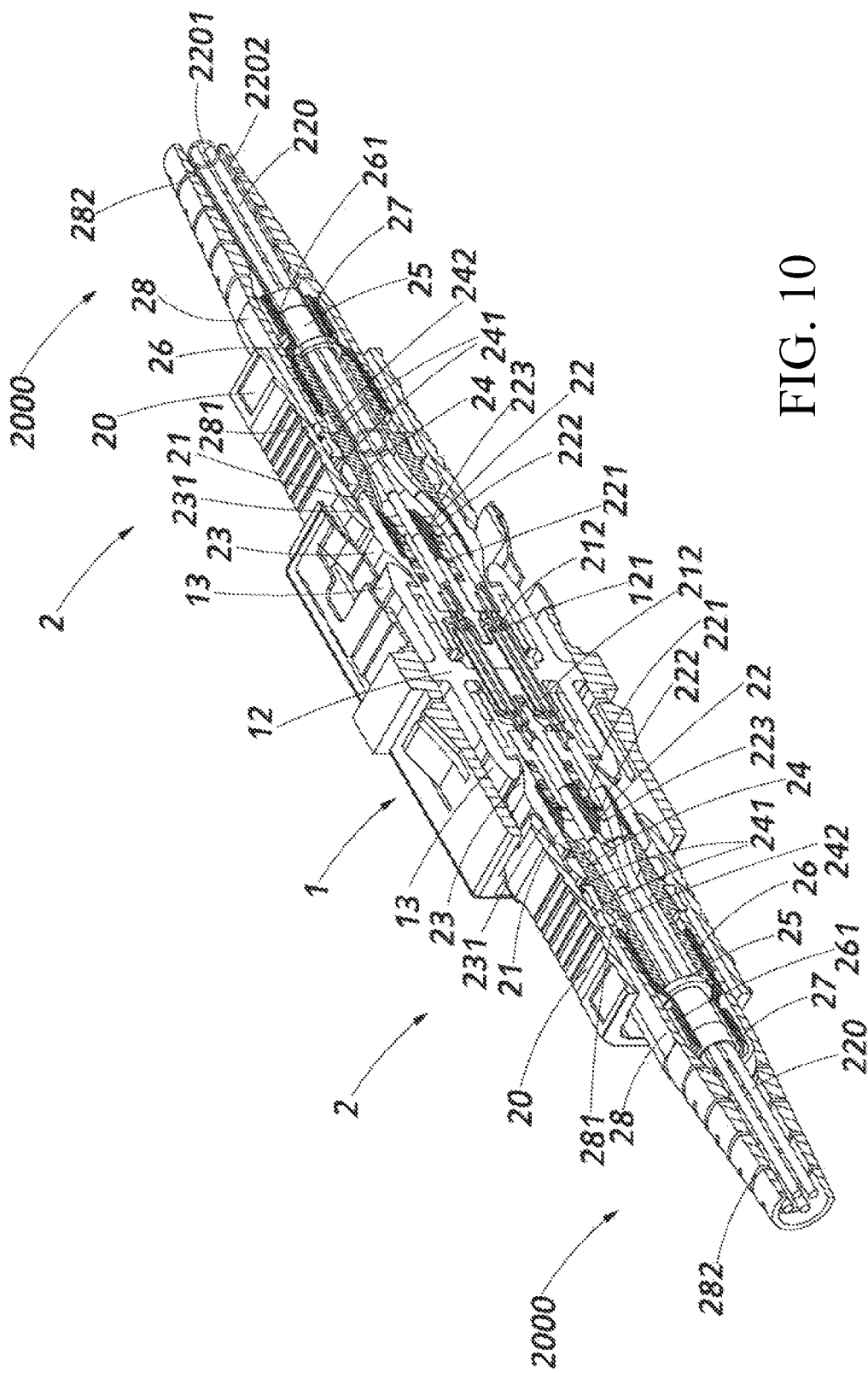
FIG. 10 is a perspective sectional assembled view of FIG. 8 of the present disclosure.

Referring to FIG. 6, FIG. 7, FIG. 8 and FIG. 10, these figures are a perspective exploded view, a perspective assembled view of and a sectional assembled view of one embodiment of the present disclosure showing two fiber optical connectors and one receptacle and a perspective sectional assembled view of FIG. 8 of the present disclosure. In the another embodiment, a fiber optical connector of the present disclosure comprises at least one fiber optical connector 2, a receptacle 1, as for a structure of the at least one fiber optical connector 2, please see the foregoing description and FIG. 1, FIG. 2, FIG. 3 and FIG. 9.

The receptacle 1 is provided with mating tubes 121 in which the ferrules 212 of the at least one fiber optical connector 2 are correspondingly inserted. In the embodiment, a center of the receptacle 1 is provided with a hollow portion 11, a center of the hollow portion 11 is provided with a middle plate 12, two sides of the middle plate 12 each are provided with a plurality of mating tubes 121, the mating tubes 121 of the two sides are communicated to each other, the two sides of the receptacle 1 each are provided with an inner latching portion 13 inside the receptacle 1 for correspondingly latching on the outer latching portion 23 of the fiber optical connector 2, therefore, the receptacle 1 can allow two fiber optical connectors 2 to insert therein at the two sides of the receptacle 1, with the mating tubes 121 of the two sides communicated to each other, each ferrule 212 of each fiber optical connector 2 is mated with respective ferrule 212 of the other fiber optical connector 2. Moreover, in the present disclosure, at least one side of the receptacle 1 is provided with a guiding groove 10, and the outer housing 20 of the corresponding fiber optical connector 2 is provided with a guiding block 201 for aligning with and inserting in the guiding groove 10 when the corresponding fiber optical connector 2 is inserted in the receptacle 1. In the embodiment, the two sides of the receptacle 1 each are provided with a plurality of mating tubes 121, in a varied embodiment, only one side of the receptacle 1 is provided with a plurality of mating tubes 121.

Comparison with the prior art, with such a structure, the present disclosure can allow a SC connector 2 of the optical fiber standard specification to be provided with a plurality of ferrules 212 inside the SC connector 2 and to be inserted in and latched with the receptacle 1 and allow the plurality of ferrules 212 to be respectively inserted in a plurality of mating tubes 121 of the receptacle 1, and in turn the present disclosure attains to increase the number of ferrules provided inside a single SC connector of the optical fiber standard specification, increase capacity without increasing an additional optical fiber tower, save space and lower cost, effectively promote ease of use, can significantly expand the utilization of the industry and possesses novelty and inventive step.

The above embodiments are merely used to describe the technical concept and features of the present disclosure, the purpose of the above embodiments is to enable those skilled in the art to understand the contents of the present disclosure and to implement the present disclosure, of course the above embodiments is not used to limit the scope of the present disclosure. The equivalents or modifications made based on the spirit disclosed by the present disclosure are intended to be included within the scope of the present disclosure.

What is claimed is:

1. A fiber optical connector, the fiber optical connector comprising an outer housing, an inner housing, a plurality of ferrules, a plurality of compressible springs, a plurality of optical fibers, a supporting seat and a rear supporting assembly; the outer housing being sheathed on the inner housing, the outer housing being provided with side holes at two sides of the outer housing, the inner housing being provided inside the outer housing and having a penetrating board at one end of the inner housing, the penetrating board being provided with a plurality of penetrating holes, the inner housing being provided with outer latching portions at two sides of the inner housing, the outer latching portions correspondingly exposed to the side holes at the two sides of the outer housing, the plurality of ferrules being provided in the inner housing and front ends of the plurality of ferrules respectively extending out of the penetrating holes of the penetrating board, a rear segment of each of the plurality of ferrules being sheathed with a compressible spring, and the plurality of ferrules respectively connecting the plurality of optical fibers, the supporting seat being sheathed on the rear segments of the plurality of ferrules and providing support for the plurality of compressible springs, the rear supporting assembly being assembled and fixed to the inner housing, the plurality of ferrules, the plurality of compressible springs and the supporting seat being assembled in the rear supporting assembly and the inner housing.

2. The fiber optical connector of claim 1, wherein the supporting seat is provided with a plurality of recessed grooves laterally opened and a plurality of through holes each positioned in one recessed groove, each ferrule, the compressible spring and the optical fiber are laterally placed in the recessed groove and the through hole of the supporting seat.

3. The fiber optical connector of claim 1, wherein the plurality of optical fibers are contained in a cable, the cable comprises an outer protective layer enclosing the plurality of optical fibers, the rear supporting assembly is sheathed on the cable and the plurality of optical fibers of the cable; the rear supporting assembly comprises a rear supporting tube, a ring, a pipe and a sleeve, the rear supporting assembly is assembled and fixed to the inner housing, wherein the rear supporting tube is inserted in the rear segment of the inner housing and is positioned at a rear end of the supporting seat, the ring is sheathed on the outer protective layer and the plurality of optical fibers of a front end of the cable, the pipe has a front section which is large and a rear section which is small, a taping portion is formed between the front section and the rear section, the front section of the pipe is sheathed on an outer surface of a rear end of the rear supporting tube, the ring is positioned inside the pipe at the taping portion, the sleeve is assembled to a rear segment of the rear supporting tube and encloses the pipe and the plurality of optical fibers.

4. The fiber optical connector of claim 3, wherein the rear supporting assembly further comprises a clamping collar, the clamping collar is sheathed on an outer surface of a rear segment of the pipe.

5. The fiber optical connector of claim 3, wherein an inner surface of a front end of the sleeve is provided with an inner flange, an outer wall surface of the rear supporting tube is provided with an annular groove for latching on the inner flange of the sleeve.

6. The fiber optical connector of claim 3, wherein an outer wall of the rear supporting tube is provided with a plurality of latching flanges for respectively latching on a plurality of openings which are provided in a wall surface of the rear segment of the inner housing.

7. The fiber optical connector of claim 1, wherein the fiber optical connector is provided with a dustproof cover, one end of the dustproof cover is provided with a handle, the other end of the dustproof cover is provided with a plurality of sheathing ducts in which the plurality of ferrules of the fiber optical connector are respectively inserted, and two sides of the dustproof cover each are provided with a side hook correspondingly latching on the outer latching portion of the fiber optical connector.

8. A fiber optical connector, comprising:
at least one fiber optical connector which comprises an outer housing, an inner housing, a plurality of ferrules, a plurality of compressible springs, a plurality of optical fibers, a supporting seat and a rear supporting assembly, the outer housing being sheathed on the inner housing, the outer housing being provided with side holes at two sides of the outer housing, the inner housing being provided inside the outer housing and having a penetrating board at one end of the inner housing, the penetrating board being provided with a plurality of penetrating holes, the inner housing being provided with outer latching portions at two sides of the inner housing, the outer latching portions correspondingly exposed to the side holes at the two sides of the outer housing, the plurality of ferrules being provided in the inner housing and front ends of the plurality of ferrules respectively extending out of the penetrating holes of the penetrating board, a rear segment of each of the plurality of ferrules being sheathed with a compressible spring, and the plurality of ferrules respectively connecting the plurality of optical fibers, the supporting seat being sheathed on the rear segments of the plurality of ferrules and providing support for the plurality of compressible springs, the rear supporting assembly being assembled and fixed to the inner housing, the plurality of ferrules, the plurality of compressible springs and the supporting seat being mounted in the rear supporting assembly and the inner housing; and a receptacle provided with mating tubes in which the ferrules of the at least one fiber optical connector are correspondingly inserted.

9. The fiber optical connector of claim 8, wherein the supporting seat is provided with a plurality of recessed grooves laterally opened and a plurality of through holes each positioned in one recessed groove, each ferrule, the compressible spring and the optical fiber are laterally placed in the recessed groove and the through hole of the supporting seat.

10. The fiber optical connector of claim 8, wherein the plurality of optical fibers are contained in a cable, the cable comprises an outer protective layer enclosing the plurality of optical fibers, the rear supporting assembly is sheathed on the cable and the plurality of optical fibers of the cable; the rear supporting assembly comprises a rear supporting tube, a ring, a pipe and a sleeve, the rear supporting assembly is assembled and fixed to the inner housing, wherein the rear supporting tube is inserted in the rear segment of the inner housing and is positioned at a rear end of the supporting seat, the ring is sheathed on the outer protective layer and the plurality of optical fibers of a front end of the cable, the pipe has a front section which is large and a rear section which is small, a taping portion is formed between the front section and the rear section, the front section of the pipe is sheathed on an outer surface of a rear end of the rear supporting tube, the ring is positioned inside the pipe at the taping portion, the sleeve is assembled to a rear segment of the rear supporting tube and encloses the pipe and the plurality of optical fibers.

11. The fiber optical connector of claim 10, wherein the rear supporting assembly further comprises a clamping collar, the clamping collar is sheathed on an outer surface of a rear segment of the pipe.

12. The fiber optical connector of claim 10, wherein an inner surface of a front end of the sleeve is provided with an inner flange, an outer wall surface of the rear supporting tube is provided with an annular groove for latching on the inner flange of the sleeve.

13. The fiber optical connector of claim 10, wherein an outer wall of the rear supporting tube is provided with a plurality of latching flanges for respectively latching on a plurality of openings which are provided in a wall surface of the rear segment of the inner housing.

14. The fiber optical connector of claim 8, wherein a center of the receptacle is provided with a hollow portion for insertion of one end of the fiber optical connector, a center of the hollow portion is provided with a middle plate and two sides of the middle plate each have a plurality of mating tubes, the mating tubes of the two sides of the receptacle are communicated to each other, two sides of the receptacle each are provided with an inner latching portion inside the receptacle for correspondingly latching on the outer latching portion of two fiber optical connectors.

* * * * *